(12) United States Patent
Tam

(10) Patent No.: US 9,104,591 B2
(45) Date of Patent: Aug. 11, 2015

(54) DATA RECOVERY ON CLUSTER FAILURES AND ECC ENHANCEMENTS WITH CODE WORD INTERLEAVING

(71) Applicant: SanDisk Technologies Inc., Plano, TX (US)

(72) Inventor: Eugene Jinglun Tam, Saratoga, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/754,644

(22) Filed: Jan. 30, 2013

(65) Prior Publication Data

US 2014/0164879 A1    Jun. 12, 2014

Related U.S. Application Data

(60) Provisional application No. 61/735,659, filed on Dec. 11, 2012.

(51) Int. Cl.
*G11C 29/00*     (2006.01)
*G06F 11/10*     (2006.01)

(52) U.S. Cl.
CPC ........ *G06F 11/1012* (2013.01); *G06F 11/1028* (2013.01)

(58) Field of Classification Search
USPC ................................................. 714/766, 773
See application file for complete search history.

(56) References Cited

U.S. PATENT DOCUMENTS

| | | | |
|---|---|---|---|
| 4,608,687 A * | 8/1986 | Dutton | 714/710 |
| 5,070,032 A | 12/1991 | Yuan et al. | |
| 5,095,344 A | 3/1992 | Harari | |
| 5,313,421 A | 5/1994 | Guterman et al. | |
| 5,315,541 A | 5/1994 | Harari et al. | |
| 5,343,063 A | 8/1994 | Yuan et al. | |
| 5,559,956 A * | 9/1996 | Sukegawa | 714/6.13 |
| 5,570,315 A | 10/1996 | Tanaka et al. | |
| 5,661,053 A | 8/1997 | Yuan | |
| 5,768,192 A | 6/1998 | Eitan | |
| 5,903,495 A | 5/1999 | Takeuchi et al. | |
| 6,011,725 A | 1/2000 | Eitan | |
| 6,046,935 A | 4/2000 | Takeuchi et al. | |
| 6,052,815 A | 4/2000 | Zook | |

(Continued)

OTHER PUBLICATIONS

Eitan et al., "NROM: A Novel Localized Trapping, 2-Bit Nonvolatile Memory Cell," IEEE Electron Device Letters, vol. 21, No. 11, Nov. 2000, pp. 543-545.

(Continued)

*Primary Examiner* — M. Mujtaba K Chaudry
(74) *Attorney, Agent, or Firm* — Davis Wright Tremaine LLP

(57) ABSTRACT

Techniques are presented for dealing with errors that arise from cluster fails, where a number of memory cells in the same area fail. An ECC code word can tolerate a given total amount of error while still being able to still be decoded, so that if error due to clusters can be identified and removed or lessened, it may be possible to still decode the word not otherwise decodable. After identifying possible error bit cluster locations, one or more bits in the cluster locations are flipped to see if the data content of the code word can be extracted. For embodiments using LDPC ECC code, uncertainty can be added for the bits of a suspected cluster location. To reduce the effects of cluster failures, code words can be interleaved within a page and the difference code words can have differing levels of ECC capability.

8 Claims, 12 Drawing Sheets

(56) References Cited

U.S. PATENT DOCUMENTS

| | | |
|---|---|---|
| 6,125,467 A | 9/2000 | Dixon |
| 6,222,762 B1 | 4/2001 | Guterman et al. |
| 6,311,305 B1 | 10/2001 | Sollish et al. |
| 6,349,390 B1 * | 2/2002 | Dell et al. .................. 714/6.24 |
| 6,357,030 B1 | 3/2002 | Demura et al. |
| 6,442,726 B1 * | 8/2002 | Knefel .......................... 714/763 |
| 6,604,220 B1 | 8/2003 | Lee |
| 7,826,274 B2 | 11/2010 | Aritome |
| 7,924,666 B2 | 4/2011 | Nakamura |
| 8,352,840 B2 | 1/2013 | Crozier et al. |
| 8,667,358 B2 | 3/2014 | Resnick |
| 2002/0085418 A1 * | 7/2002 | Goto et al. ............... 365/185.11 |
| 2006/0126383 A1 | 6/2006 | Shappir et al. |
| 2007/0091677 A1 | 4/2007 | Lasser et al. |
| 2007/0288687 A1 * | 12/2007 | Panabaker .................... 711/103 |
| 2009/0021978 A1 | 1/2009 | Lin et al. |
| 2009/0113120 A1 * | 4/2009 | Murin .......................... 711/103 |
| 2010/0172180 A1 | 7/2010 | Paley et al. |
| 2011/0099460 A1 | 4/2011 | Dusja et al. |
| 2012/0320679 A1 * | 12/2012 | Sprouse et al. .......... 365/185.12 |

OTHER PUBLICATIONS

Office Action for U.S. Appl. No. 13/754,627 mailed Aug. 7, 2014, 21 pages.

* cited by examiner

Programming into two states represented by a 1-bit code

DATA RECOVERY ON CLUSTER FAILURES AND ECC ENHANCEMENTS WITH CODE WORD INTERLEAVING

CROSS-REFERENCE TO RELATED APPLICATION

This application claims priority to and the benefit of U.S. Provisional Application No. 61/735,659, filed Dec. 11, 2012, and is related to a U.S. patent application by Eugene Tam, entitled "Data Recovery on Cluster Failures and ECC Enhancements with Code Word Interleaving," filed Jan. 30, 2013, and having application Ser. No. 13/754,627 and published as 2014-0164878, which applications are incorporated herein in their entirety by this reference.

FIELD OF THE INVENTION

This application relates to the operation of re-programmable non-volatile memory systems such as semiconductor flash memory, and, more specifically, to Error Correction Code (ECC) techniques for such memories.

BACKGROUND OF THE INVENTION

Solid-state memory capable of nonvolatile storage of charge, particularly in the form of EEPROM and flash EEPROM packaged as a small form factor card, has recently become the storage of choice in a variety of mobile and handheld devices, notably information appliances and consumer electronics products. Unlike RAM (random access memory) that is also solid-state memory, flash memory is non-volatile, and retaining its stored data even after power is turned off. Also, unlike ROM (read only memory), flash memory is rewritable similar to a disk storage device. In spite of the higher cost, flash memory is increasingly being used in mass storage applications. Conventional mass storage, based on rotating magnetic medium such as hard drives and floppy disks, is unsuitable for the mobile and handheld environment. This is because disk drives tend to be bulky, are prone to mechanical failure and have high latency and high power requirements. These undesirable attributes make disk-based storage impractical in most mobile and portable applications. On the other hand, flash memory, both embedded and in the form of a removable card are ideally suited in the mobile and handheld environment because of its small size, low power consumption, high speed and high reliability features.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that must be applied to the control gate before the transistor is turned "on" to permit conduction between its source and drain regions. In particular, flash memory such as Flash EEPROM allows entire blocks of memory cells to be erased at the same time.

The floating gate can hold a range of charges and therefore can be programmed to any threshold voltage level within a threshold voltage window. The size of the threshold voltage window is delimited by the minimum and maximum threshold levels of the device, which in turn correspond to the range of the charges that can be programmed onto the floating gate. The threshold window generally depends on the memory device's characteristics, operating conditions and history. Each distinct, resolvable threshold voltage level range within the window may, in principle, be used to designate a definite memory state of the cell.

It is common in current commercial products for each storage element of a flash EEPROM array to store a single bit of data by operating in a binary mode, where two ranges of threshold levels of the storage element transistors are defined as storage levels. The threshold levels of transistors correspond to ranges of charge levels stored on their storage elements. In addition to shrinking the size of the memory arrays, the trend is to further increase the density of data storage of such memory arrays by storing more than one bit of data in each storage element transistor. This is accomplished by defining more than two threshold levels as storage states for each storage element transistor, four such states (2 bits of data per storage element) now being included in commercial products. More storage states, such as 16 states per storage element, are also being implemented. Each storage element memory transistor has a certain total range (window) of threshold voltages in which it may practically be operated, and that range is divided into the number of states defined for it plus margins between the states to allow for them to be clearly differentiated from one another. Obviously, the more bits a memory cell is configured to store, the smaller is the margin of error it has to operate in.

The transistor serving as a memory cell is typically programmed to a "programmed" state by one of two mechanisms. In "hot electron injection," a high voltage applied to the drain accelerates electrons across the substrate channel region. At the same time a high voltage applied to the control gate pulls the hot electrons through a thin gate dielectric onto the floating gate. In "tunneling injection," a high voltage is applied to the control gate relative to the substrate. In this way, electrons are pulled from the substrate to the intervening floating gate. While the term "program" has been used historically to describe writing to a memory by injecting electrons to an initially erased charge storage unit of the memory cell so as to alter the memory state, it has now been used interchangeable with more common terms such as "write" or "record."

The memory device may be erased by a number of mechanisms. For EEPROM, a memory cell is electrically erasable, by applying a high voltage to the substrate relative to the control gate so as to induce electrons in the floating gate to tunnel through a thin oxide to the substrate channel region (i.e., Fowler-Nordheim tunneling.) Typically, the EEPROM is erasable byte by byte. For flash EEPROM, the memory is electrically erasable either all at once or one or more minimum erasable blocks at a time, where a minimum erasable block may consist of one or more sectors and each sector may store 512 bytes or more of data.

The memory device typically comprises one or more memory chips that may be mounted on a card. Each memory chip comprises an array of memory cells supported by peripheral circuits such as decoders and erase, write and read circuits. The more sophisticated memory devices also come with a controller that performs intelligent and higher level memory operations and interfacing.

There are many commercially successful non-volatile solid-state memory devices being used today. These memory devices may be flash EEPROM or may employ other types of nonvolatile memory cells. Examples of flash memory and systems and methods of manufacturing them are given in U.S.

Pat. Nos. 5,070,032, 5,095,344, 5,315,541, 5,343,063, and 5,661,053, 5,313,421 and 6,222,762. In particular, flash memory devices with NAND string structures are described in U.S. Pat. Nos. 5,570,315, 5,903,495, 6,046,935. Also non-volatile memory devices are also manufactured from memory cells with a dielectric layer for storing charge. Instead of the conductive floating gate elements described earlier, a dielectric layer is used. Such memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. For example, U.S. Pat. Nos. 5,768,192 and 6,011,725 disclose a nonvolatile memory cell having a trapping dielectric sandwiched between two silicon dioxide layers. Multi-state data storage is implemented by separately reading the binary states of the spatially separated charge storage regions within the dielectric.

Errors in Written Data

In the types of memory systems described herein, as well as in others, including magnetic disc storage systems, the integrity of the data being stored is maintained by use of an error correction technique. Most commonly, an error correction code (ECC) is calculated for each sector or other unit of data that is being stored at one time, and that ECC is stored along with the data. The ECC is most commonly stored together with a unit group of user data from which the ECC has been calculated. The unit group of user data may be a sector or a multi-sector page. When this data is read from the memory, the ECC is used to determine the integrity of the user data being read. Erroneous bits of data within the unit group of data can often be corrected by use of the ECC.

The trend is to reduce the size of the memory systems in order to be able to put more memory cells in the system and to make the system as small as possible to fit in smaller host devices. Memory capacity is increased by a combination of higher integration of circuits and configuring each memory cell to store more bits of data. Both techniques require the memory to operate with increasing tighter margin of error. This in turn places more demand on the ECC to correct errors. The ECC can be designed to correct a predetermined number of error bits. The more bits it has to correct, the more complex and computationally intensive will the ECC be.

A memory device typically includes one or more memory chips in cooperation with a memory controller chip. Each memory chip has an array of memory cells and peripheral circuits and a basic on-chip control circuit driven by a state machine to control low-level memory operations such as read, write and erase operations. The memory controller chip typically has a microprocessor and RAM to handle more complex operations and data processing. Since ECC is computationally intensive, it is usually handled by the memory controller. Owing to the ECC operations being located on an external memory controller, data read from the memory chip must be toggled out to the memory controller in order to perform ECC operations. A non-volatile memory typically operates with a host to store and retrieve data. In a normal host read, the read data has to be toggled out anyway, so on its way to the host via the controller, it can have the controller perform ECC operations.

When ECC is used to correct error bits in NAND flash and other memory types, data on pages are divided into code words, which are the units for error corrections. Within a code word, total number of correctable error bits is limited by the ECC capability of the code word. In situations where error bits are clustered together, the clustered error bits add to the total amount of error of the code word and reduce number of random error bits in the code word that are correctable. As the result, code words with clustered error bits often cannot be corrected with ECC and result in uncorrectable error data.

Thus, there is a need to address the problem of correcting cluster error bit errors and allow more random failure bits, effectively allowing the memory system to correct more error bits within the device's ECC capability.

SUMMARY OF INVENTION

According to one set of aspects, a method of reading data stored in a non-volatile memory array of a memory system is presented. The method includes reading an ECC code word written in memory cells along a word line of the non-volatile memory array, the ECC code word including a plurality of bits of data and one or more bits of error correction code associated with the data. A location along the word line from which the ECC code word was read that may have a cluster of errors is identified. The value of one or more bits of the ECC code word from at or near the identified location is altered. The ECC code word with the altered values are fed to ECC circuitry on the memory system. The ECC circuitry determines whether the ECC code word with the altered values can be successfully decoded by the ECC circuitry.

Further aspects present a method of writing data to a non-volatile memory system. The memory system includes a memory circuit having an array of memory cells formed along bit lines and word lines and a controller circuit connected to the memory circuit and having ECC circuitry. The method includes: receiving a set of data at the controller circuit; forming the data into ECC code words, each ECC code word including a plurality of bits of data and one or more bits of error correction code associated with the data; and writing a first plurality of the ECC code words onto a first word line of the array, wherein the ECC code word are written in an interleaved manner wherein at least some of the ECC code words are not written into a contiguous set of memory cells along the first word line.

Various aspects, advantages, features and embodiments of the present invention are included in the following description of exemplary examples thereof, whose description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION OF THE PREFERRED EMBODIMENTS

Memory System

Figure 1:
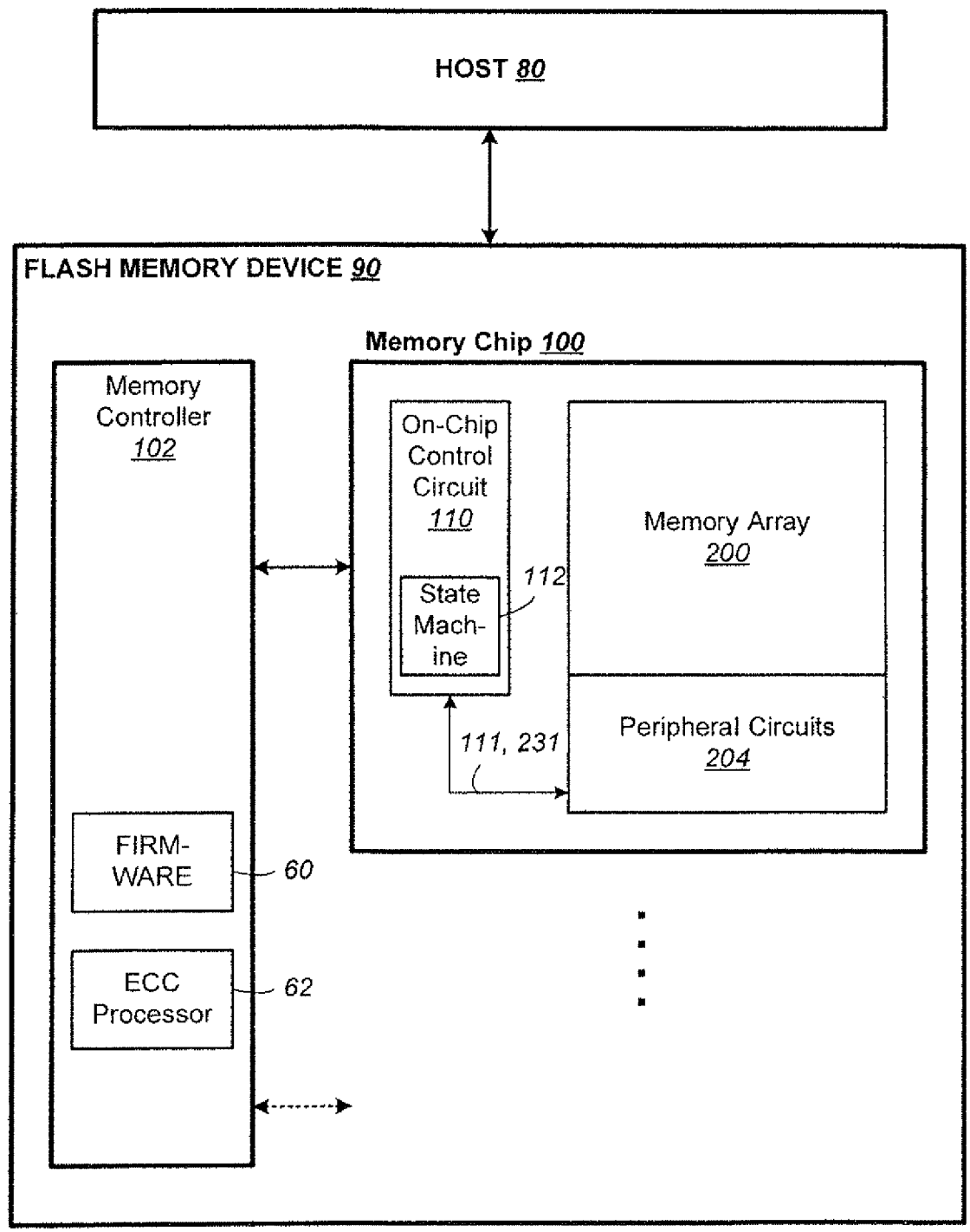
FIG. 1 illustrates a host in communication with a memory device in which the features of the present invention are embodied.

FIG. 1 illustrates a host in communication with a memory device in which the features of the present invention are embodied. The host 80 typically sends data to be stored at the memory device 90 or retrieves data by reading the memory device 90. The memory device 90 includes one or more memory chip 100 managed by a memory controller 102. The memory chip 100 includes a memory array 200 of memory cells with each cell capable of being configured as a multi-level cell ("MLC") for storing multiple bits of data, as well as capable of being configured as a single-level cell ("SLC") for storing 1 bit of data. The memory chip also includes peripheral circuits 204 such as row and column decoders, sense modules, data latches and I/O circuits. An on-chip control circuitry 110 controls low-level memory operations of each chip. The control circuitry 110 is an on-chip controller that cooperates with the peripheral circuits to perform memory operations on the memory array 200. The control circuitry 110 typically includes a state machine 112 to provide chip level control of memory operations via a data bus 231 and control and address bus 111.

In many implementations, the host 80 communicates and interacts with the memory chip 100 via the memory controller 102. The controller 102 co-operates with the memory chip and controls and manages higher level memory operations. A firmware 60 provides codes to implement the functions of the controller 102. An error correction code ("ECC") processor 62 processes ECC during operations of the memory device.

For example, in a host write, the host 10 sends data to be written to the memory array 100 in logical sectors allocated from a file system of the host's operating system. A memory block management system implemented in the controller stages the sectors and maps and stores them to the physical structure of the memory array. A preferred block management system is disclosed in United States Patent Application Publication Number: US-2010-0172180-A1, the entire disclosure of which is incorporated herein by reference.

Physical Memory Architecture

In order to improve read and program performance, multiple charge storage elements or memory transistors in an array are read or programmed in parallel. Thus, a "page" of memory elements are read or programmed together. In existing memory architectures, a row typically contains several interleaved pages or it may constitute one page. All memory elements of a page will be read or programmed together.

Figure 2:
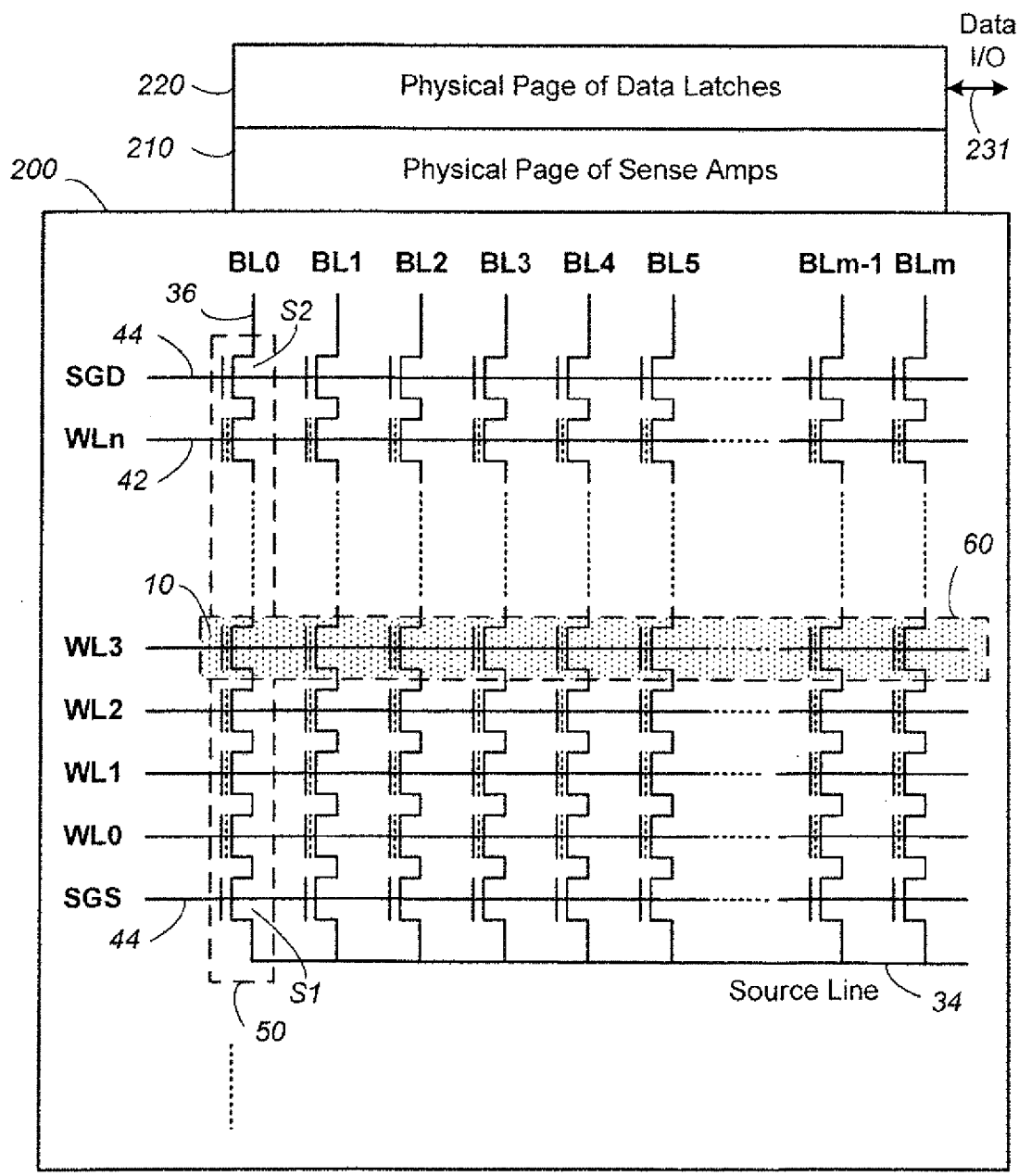
FIG. 2 illustrates a page of memory cells, organized for example in the NAND configuration, being sensed or programmed in parallel.

FIG. 2 illustrates a page of memory cells, organized for example in the NAND configuration, being sensed or programmed in parallel. FIG. 2 essentially shows a bank of NAND strings 50 in the memory array 200 of FIG. 1. A "page" such as the page 60, is a group of memory cells enabled to be sensed or programmed in parallel. This is accomplished in the peripheral circuits by a corresponding page of sense amplifiers 210. The sensed results are latches in a corresponding set of data latches 220. Each sense amplifier can be coupled to a NAND string, such as NAND string 50 via a bit line 36. For example, the page 60 is along a row and is sensed by a sensing voltage applied to the control gates of the cells of the page connected in common to the word line WL3. Along each column, each cell such as cell 10 is accessible by a sense amplifier via a bit line 36. Data in the data latches 220 are toggled in from or out to the memory controller 102 via a data I/O bus 231.

The page referred to above is a physical page memory cells or sense amplifiers. Depending on context, in the case where each cell is storing multi-bit data, each physical page has multiple data pages.

The NAND string 50 is a series of memory transistors 10 daisy-chained by their sources and drains to form a source terminal and a drain terminal respective at its two ends. A pair of select transistors S1, S2 controls the memory transistors chain's connection to the external via the NAND string's source terminal and drain terminal respectively. In a memory array, when the source select transistor S1 is turned on, the source terminal is coupled to a source line 34. Similarly, when the drain select transistor S2 is turned on, the drain terminal of the NAND string is coupled to a bit line 36 of the memory array. Each memory transistor 10 in the chain acts as a memory cell. It has a charge storage element 20 to store a given amount of charge so as to represent an intended memory state. A control gate of each memory transistor allows control over read and write operations. The control gates of corresponding memory transistors of a row of NAND string are all connected to the same word line (such as WL0, WL1, . . . ) Similarly, a control gate of each of the select transistors S1, S2 (accessed via select lines SGS and SGD respectively) provides control access to the NAND string via its source terminal and drain terminal respectively.

Erase Blocks

One important difference between flash memory and other type of memory is that a cell must be programmed from the erased state. That is the floating gate must first be emptied of charge. Programming then adds a desired amount of charge back to the floating gate. It does not support removing a portion of the charge from the floating to go from a more programmed state to a lesser one. This means that update data cannot overwrite existing one and must be written to a previous unwritten location.

Furthermore erasing is to empty all the charges from the floating gate and generally takes appreciably time. For that reason, it will be cumbersome and very slow to erase cell by cell or even page by page. In practice, the array of memory cells is divided into a large number of blocks of memory cells. As is common for flash EEPROM systems, the block is the unit of erase. That is, each block contains the minimum number of memory cells that are erased together.

Figure 3:
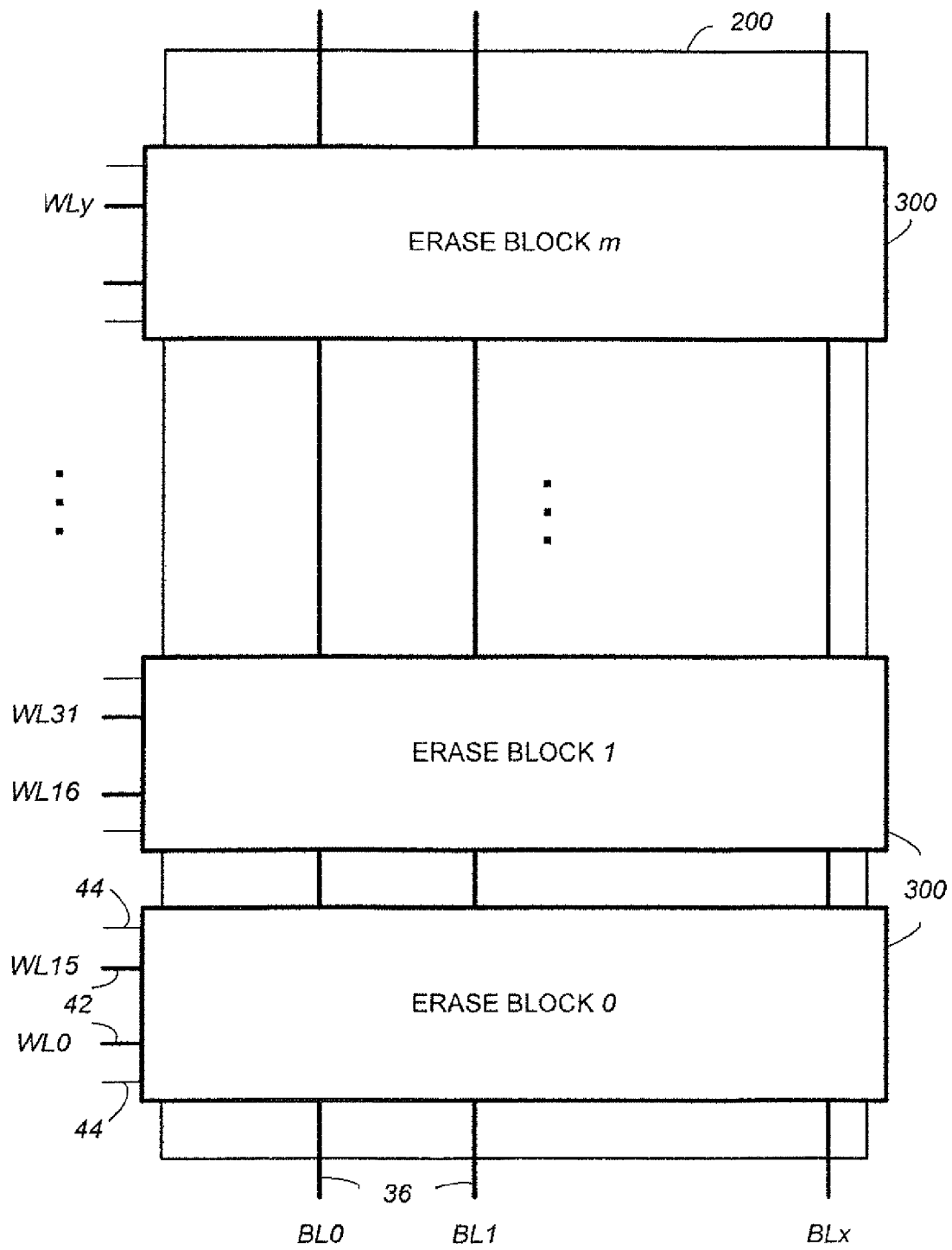
FIG. 3 illustrates schematically an example of a memory array organized in erasable blocks.

FIG. 3 illustrates schematically an example of a memory array organized in erasable blocks. Programming of charge storage memory devices can only result in adding more charge to its charge storage elements. Therefore, prior to a program operation, existing charge in charge storage element of a memory cell must be removed (or erased). A non-volatile memory such as EEPROM is referred to as a "Flash" EEPROM when an entire array of cells 200, or significant groups of cells of the array, is electrically erased together (i.e., in a flash). Once erased, the group of cells can then be reprogrammed. The group of cells erasable together may consist of one or more addressable erase unit 300. The erase unit or block 300 typically stores one or more pages of data, the page being a minimum unit of programming and reading, although more than one page may be programmed or read in a single operation. Each page typically stores one or more sectors of data, the size of the sector being defined by the host system. An example is a sector of 512 bytes of user data, following a standard established with magnetic disk drives, plus some number of bytes of overhead information about the user data and/or the block in with it is stored.

In the example shown in FIG. 3, individual memory cells in the memory array 200 are accessible by word lines 42 such as WL0-WLy and bit lines 36 such as BL0-BLx. The memory is organized into erase blocks, such as erase blocks 0, 1, . . . m. If the NAND string 50 (see FIG. 2) contains 16 memory cells, then the first bank of NAND strings in the array will be accessible by select lines 44 and word lines 42 such as WL0 to WL15. The erase block 0 is organized to have all the memory cells of the first bank of NAND strings erased together. In memory architecture, more than one bank of NAND strings may be erased together.

Examples of Binary (SLC) and Multi-level (MLC) Memory Cells

As described earlier, an example of nonvolatile memory is formed from an array of field-effect transistors, each having a charge storage layer between its channel region and its control gate. The charge storage layer or unit can store a range of charges, giving rise to a range of threshold voltages for each field-effect transistor. The range of possible threshold voltages spans a threshold window. When the threshold window is partitioned into multiple sub-ranges or zones of threshold voltages, each resolvable zone is used to represent a different memory states for a memory cell. The multiple memory states can be coded by one or more binary bits.

Figure 4:
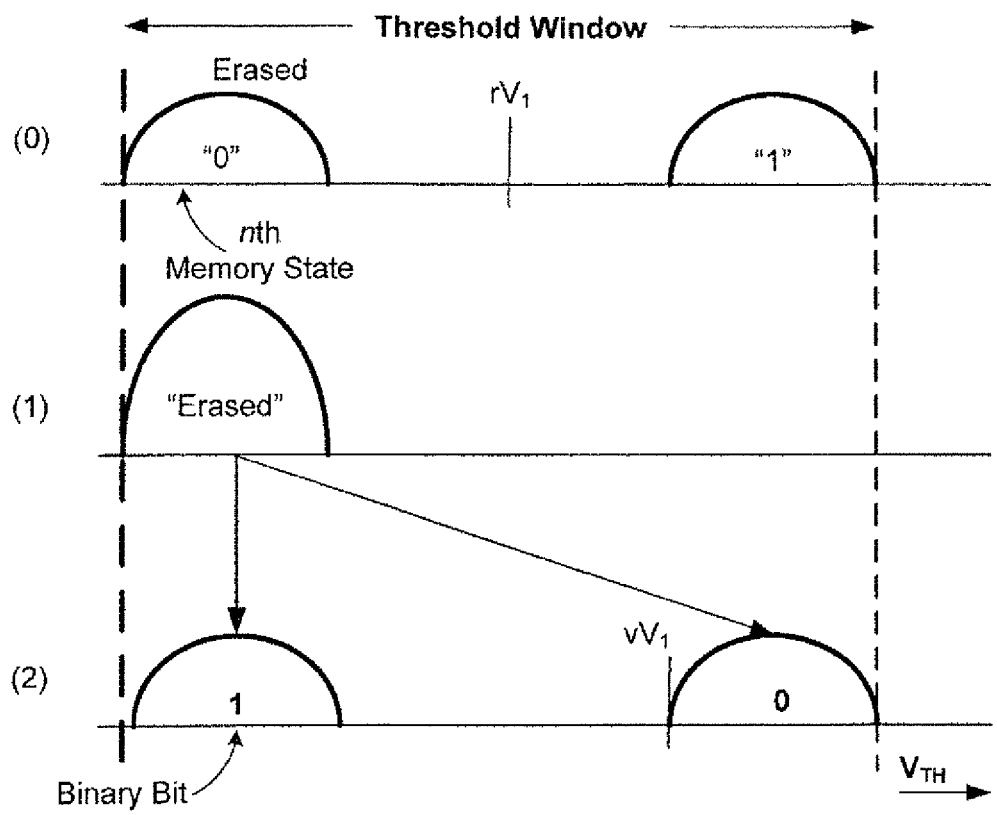
FIG. 4 illustrates a binary memory having a population of cells with each cell being in one of two possible states.

FIG. 4 illustrates a binary memory having a population of cells with each cell being in one of two possible states. Each memory cell has its threshold window partitioned by a single demarcation level into two distinct zones. As shown in FIG. 4(0), during read, a read demarcation level $rV_1$, between a lower zone and an upper zone, is used to determine to which zone the threshold level of the cell lies. The cell is in an "erased" state if its threshold is located in the lower zone and is in a "programmed" state if its threshold is located in the upper zone. FIG. 4(1) illustrates the memory initially has all its cells in the "erased" state. FIG. 4(2) illustrates some of cells being programmed to the "programmed" state. A 1-bit or binary code is used to code the memory states. For example, the bit value "1" represents the "erased" state and "0" represents the "programmed" state. Typically programming is performed by application of one or more programming voltage pulse. After each pulse, the cell is sensed to verify if the threshold has moved beyond a verify demarcation level $vV_1$. A memory with such memory cell partitioning is referred to as "binary" memory or Single-level Cell ("SLC") memory. It will be seen that a binary or SLC memory operates with a wide margin of error as the entire threshold window is only occupied by two zones.

Figure 5:
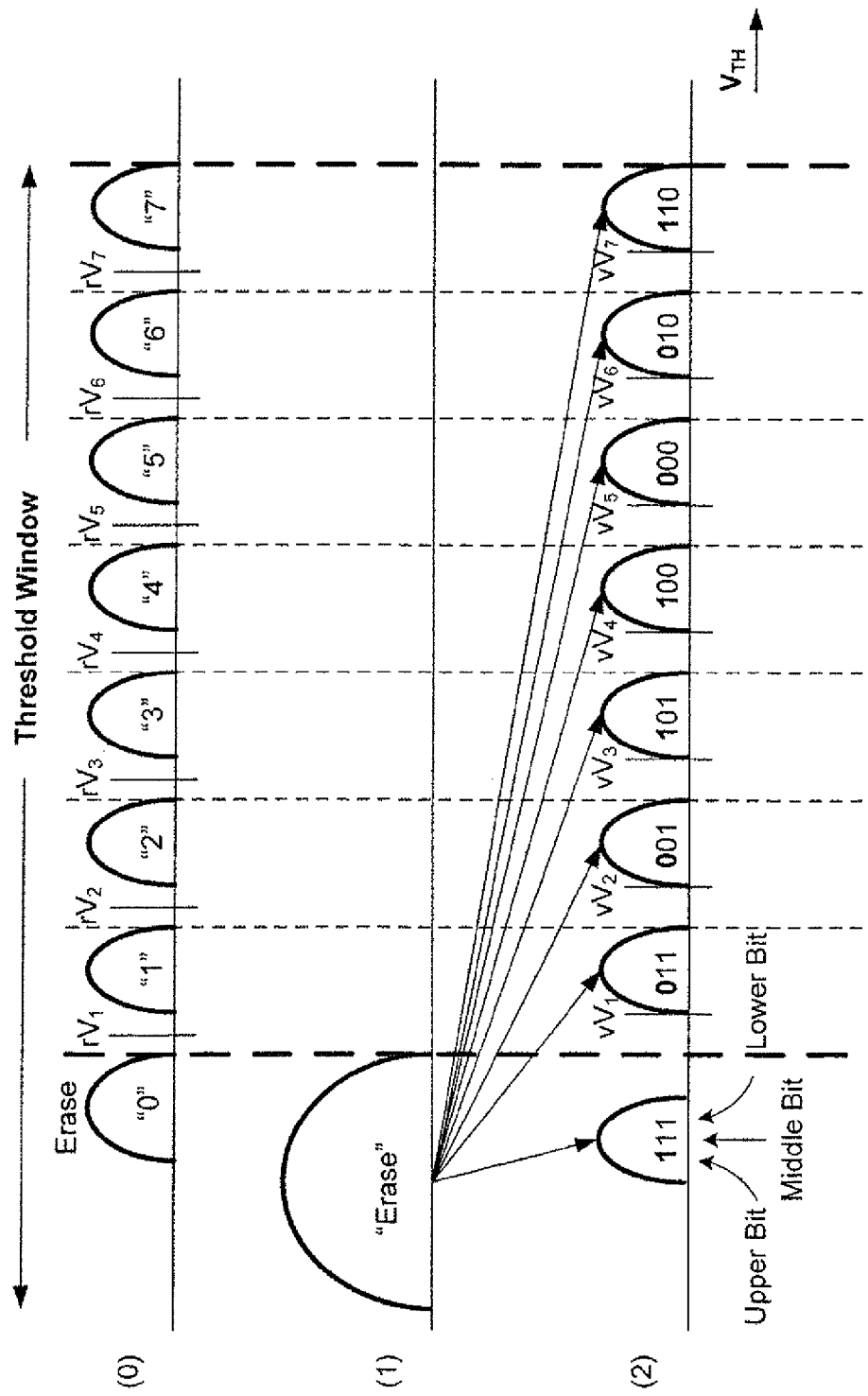
FIG. 5 illustrates a multi-state memory having a population of cells with each cell being in one of eight possible states.

FIG. 5 illustrates a multi-state memory having a population of cells with each cell being in one of eight possible states. Each memory cell has its threshold window partitioned by at least seven demarcation levels into eight distinct zones. As shown in FIG. 5(0), during read, read demarcation levels $rV_1$ to $rV_7$ are used to determine to which zone the threshold level of the cell lies. The cell is in an "erased" state if its threshold is located in the lowest zone and is in one of multiple "programmed" states if its threshold is located in the upper zones. FIG. 5(1) illustrates the memory initially has all its cells in the "erased" state. FIG. 5(2) illustrates some of cells being programmed to the "programmed" state. A 3-bit code having lower, middle and upper bits can be used to represent each of the eight memory states. For example, the "0", "1", "2", "3", "4", "5", "6" and "7" states are respectively represented by "111", "011", "001", "101", "100", "000", "010" and "110". Typically programming is performed by application of one or more programming voltage pulses. After each pulse, the cell is sensed to verify if the threshold has moved beyond a reference which is one of verify demarcation levels $vV_1$ to $vV_7$. A memory with such memory cell partitioning is referred to as "multi-state" memory or Multi-level Cell ("MLC") memory. In a number programming method employs multiple programming passes before the cells are programmed to their target states in order to alleviate floating-gate to floating-gate perturbations.

Similarly, a memory storing 4-bit code will have lower, first middle, second middle and upper bits, representing each of the sixteen states. The threshold window will be demarcated by at least 15 demarcation levels into sixteen distinct zones.

As the memory's finite threshold window is partitioned into more regions, the resolution for programming and reading will necessarily become finer. Thus, a multi-state or MLC memory necessarily operates with a narrower margin of error compared to that of a memory with less partitioned zones. In other words, the error rate increases with the number of bits stored in each cell. In general, error rate increases with the number of partitioned zones in the threshold window.

Error Detection and Correction by Error Correction Code ("ECC")

Flash memory is prone to errors. To ensure error-free data, an error correction code ("ECC") is implemented to correct errors.

Figure 6:
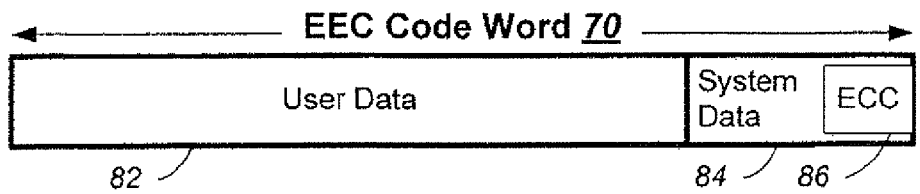
FIG. 6 illustrates schematically a unit of data being stored with an ECC field.

FIG. 6 illustrates schematically a unit of data being stored with an ECC field. As described in connection with FIG. 2, a physical page of memory cells is programmed and read in parallel by virtue of a corresponding page of sense modules operating in parallel. When each memory cell stores multiple bits of data, there will be multiple binary data pages associated with each physical page on a word line. The data page 70 will be referred to as an "ECC code word" 70 to indicate that it is a unit of data with its own ECC. The ECC code word 70 comprises a user portion 82 and a system portion 84. The user portion 82 is for storage of user data. The system portion 84 is generally used by the memory system for storage of system data. Included in the system data is an ECC 86. The ECC 86 is computed for the data page 70. Typically, the ECC is computed by the ECC processor 62 in the controller 102 (see FIG. 1.) In some embodiments, when the data page is large, it can be partitioned into smaller portions, each with its own ECC.

As data is received from a host, a page of data is staged in the controller 102 and its ECC 86 is computed by the ECC processor 62. The ECC code word incorporating the ECC is then written to the memory array 200. Later, when the ECC code word is read, it is latched in the data latches 220 and shifted out of the I/O circuits 230 to the controller 102. At the controller 102, the ECC code word's existing ECC is compared to a second version of the ECC computed on the read data. The ECC typically includes an error detection code ("EDC") for rapid detection of any error in the data page. If the EDC indicates the existence of any error in the read data page, the ECC is invoked to correct erroneous bits in the read data page. The ECC is designed to correct up to a predetermined maximum number of errors. In practice, at any given time in the life of a memory, the ECC may have budget to correct a predetermined number of errors less than the predetermined maximum.

Figure 7:
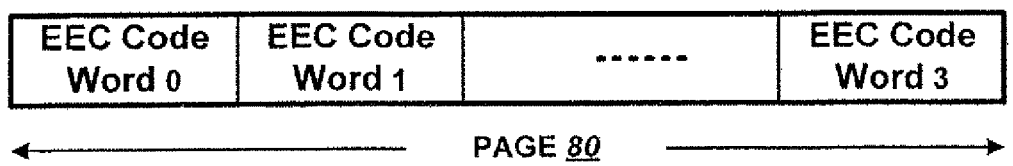
FIG. 7 illustrates one embodiment in which the memory system employs larger parallelism with a page containing more than one ECC code word.

FIG. 7 illustrates one embodiment in which the memory system employs larger parallelism with a page containing more than one ECC code word. For example, an ECC code word can store 2 Kbytes of data. The page 80 can contain four ECC code words, storing 8 Kbytes of data. The memory system can read and write as much as a page at a time.

Figure 8:
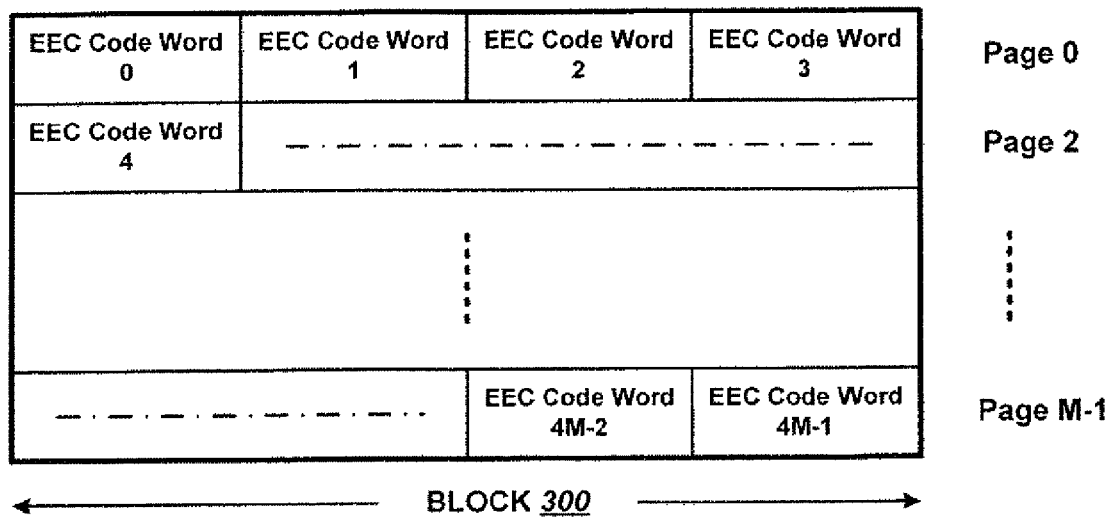
FIG. 8 illustrates an erase block containing multiple ECC code words.

FIG. 8 illustrates an erase block containing multiple ECC code words. As shown in FIG. 3, an erase block 300 is a unit of erase in which all memory cells therein are erased together. FIG. 8 shows the erase block to contain M pages. For example, the block 300 contains 86 pages and each page contains 4 ECC code words. So the block 300 contains a total of 344 ECC code words.

More detail on aspects of error management by ECC is disclosed in U.S. application Ser. No. 12/642,728 filed on Dec. 18, 2009, entitled "NON-VOLATILE MEMORY AND METHOD WITH POST-WRITE READ AND ADAPTIVE RE-WRITE TO MANAGE ERRORS" by Dusija et al, U.S. Patent Publication No. 2011/0099460 A1, the entire disclosure of which is incorporated herein by reference.

Data Recovery on Cluster Failures

This section looks at techniques for dealing with errors that arise from cluster fails, where a number of memory cells in the same area fail. This can be the result of a defect in a memory array itself, such as due defective bit lines or cell defects that arise during processing, or due to defects in the periphery circuitry used to read the array, such as the sense amps. Such defects can result in a multiple error clustering in a location of the memory. An ECC code word can tolerate a given total amount of error while still being able to still be decoded, so whatever error correction ability is used by the cluster fail is not available for random errors, reducing that effective amount of error correction capability available. Consequently, if error due to error clusters can be identified and removed or lessened, it may be possible to still decode the word. Noted that it is not necessary to completely remove all cluster fail bits, but only enough to successfully decode the word by the ECC circuitry.

Figure 9A:
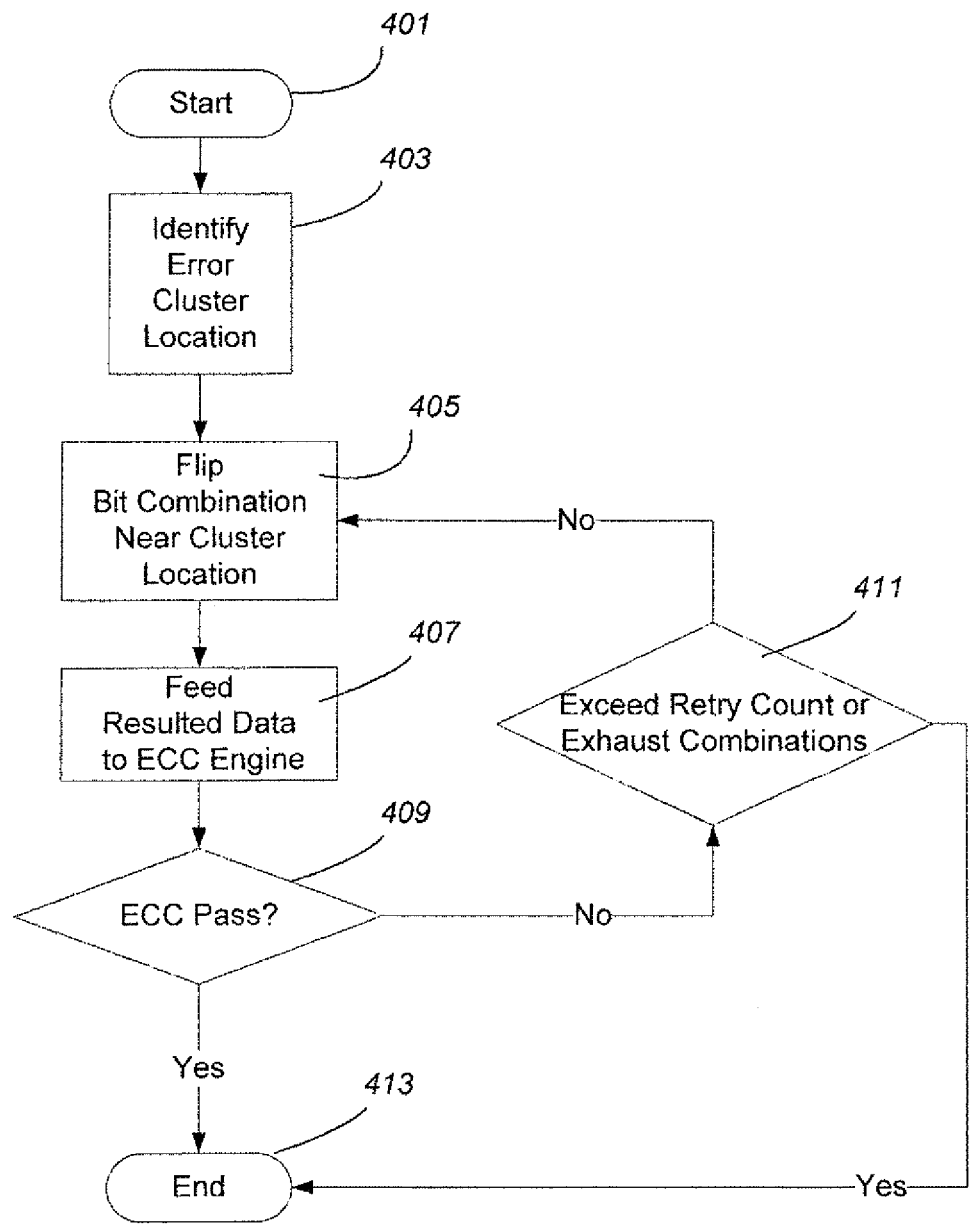
FIGS. 9A and 9B are exemplary algorithms for recovering data in the case of error bit clusters.

FIG. 9A illustrates an exemplary embodiment for a general algorithm for this data recovery process that can be performed by the ECC circuitry of the memory system, starting at 401. The process can be used in response to an uncorrectable amount of error in standard read operation, which can include normal ECC procedures; in response to a high, but still correctable amount of error; based upon an expectation of cluster error due to, say, a code words physical location; or even used as part of a general read process. At 403, the process identifies possible error bit cluster locations, after which the value of one or more bits in the cluster locations are flipped at 405. The resultant data is then fed into the ECC circuitry for error correction and, at 409, it is determined whether or not the ECC engine can correct the rest of the error: if, the process is complete (413) and the decoded data can be supplied to the host in the case of a host read, rewritten to another location if the read was for garbage collection, and so on; if not, the process loops back. First, at 411 it can be checked to see if the total number of retries has exceeding a limit or all location combinations has been tried and, if the system stops the attempt and fail to recover data, going to 413 and a read fail due to error can be reported out. If the retries have not been exhausted, the flow goes back to 405 to flip bits in location combinations previously have not tried before.

Figure 10:
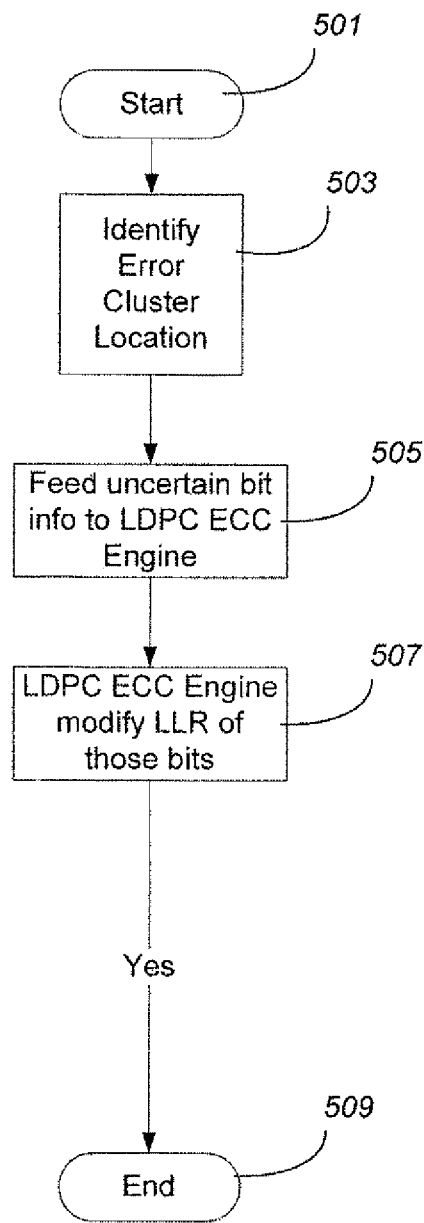
FIG. 10 illustrates an alternate algorithm far LDPC.

The techniques of the section, such as the flow just described, can be used with any of the various error correction codes (BCH, Reed-Solomon, and so on), but FIG. 10 considers some alternative algorithms when a low-density parity-check (LDPC) code is used. In an LDPC arrangement, an amount of uncertainty can be entered for a bit's value, say (½, ½), rather than just 1 or 0. This is used in the variation of FIG. 10, that can be used on its own or within the flow of FIG. 9A.

Figure 9B:
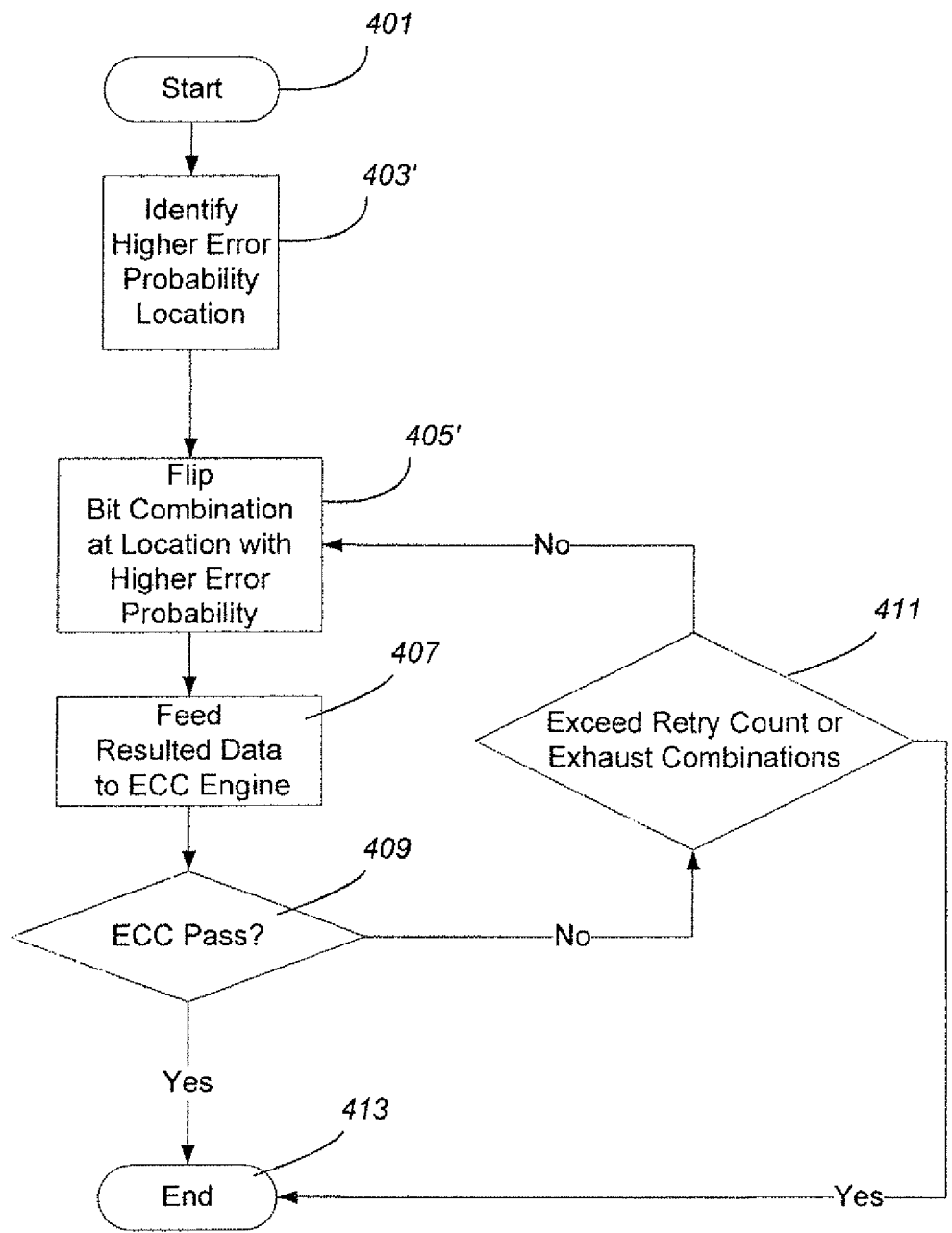

FIG. 10 starts at 501, where the flow can be inserted before LDPC error correction starts. At 503 the error cluster location (or likely location) is identified. For the bits in the identified location, uncertainty can then be fed in at 505. The LDPC ECC then modifies the log-likelihood ratio (LLR) of these bits at 507. In FIG. 10 the process then ends at this point (509), but more generally, the result can be checked to see whether the code word can be decoded and, if not, the process can loop back as in FIG. 9A, where the feeding of uncertainty of 505 takes the place of bit flipping at 405 of FIG. 9A. An example of this is shown in FIG. 9B, where these modifications of this variation are shown at 403' and 405'.

Figure 11A:
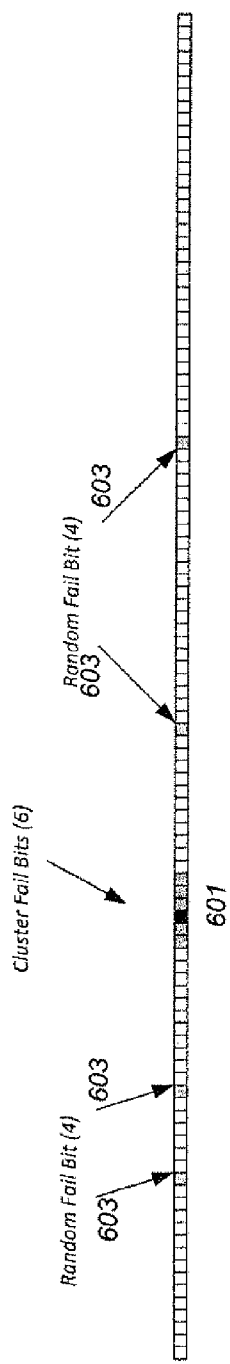
FIGS. 11A-C illustrate the concept of flipping fail bits and using the ECC to correct random bit fails
Figure 11B:
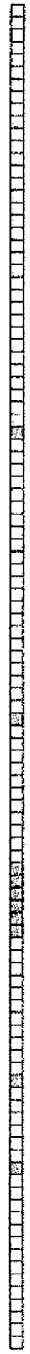
Figure 11C:

Considering the main idea involved here further, error bits (Fail bits) can be categorized into two groups: random fail bit; and cluster fail bits. The idea here is to flip some or all of the failed bits of the cluster to sufficiently reduce this source of error to a level allowing the ECC engine to correct the error from the random fail bits. FIGS. 11A-C illustrates the concept. In FIG. 11A, an ECC code word is represented schematically as it would appear along a word line, the squares representing the bits. The code word has four random fail bits, marked as 603, and a cluster fail of 6 bits at 601. As discussed above with respect to FIG. 7, a page will typically have several such code words written along a word line. In a binary memory, where each cell stores one bit of data, each physical page will store one page of data, while in a multi-state memory each physical page will store multiple pages of data. In FIG. 11A and the similar following figures, the code word shown for the example could be either from a binary format memory or a code word from any one of the logical pages from an MLC format (such as a lower page, upper page, and so on).

When received at the ECC engine (62, FIG. 1), a conventional scheme would not distinguish between random and cluster fail bits. It would then see them as represented in FIG. 11B and treat all of the failed bits the same, requiring sufficient ECC ability to correct all of the failed bits (here, 4+6=10). Under the techniques of this section, the system can correct the cluster fails, so that it only need to rely on the ECC random fail bits. In this example, this means that the ECC only needs to correct only four bits, as represented in FIG. 11C. As a result, the ECC engine can correct many more bits than its basic capability. Of course, the correct data value for this cluster bits could be either a 0 or a 1, so these bits need to be flipped in such away the correct enough combination is supplied to the ECC processing circuitry, where correct enough mean that the error is reduced to the point where the code word can be successfully extracted.

The bit flipping scheme can be random, based upon a cluster failure model, based on natural probability, or some combination of these. One example of a cluster failure model is a "stuck" model where if, for example, the cluster bits are only or mostly stuck to 1, the system only flips bits to read as 0. Another cluster failure model is a location model: if the bits have a higher probability of failure when closed to the known failure location, the system can flip the bits close to the failure location first. For example, this could be a location, such as near word line ends, that is prone to problems. In this way, location provides bit flip priority or, for a LDPC code, a location for which to add in uncertainty. When based on natural probability, it is more probable that a fewer number bits fail than a greater number. The system can start by flipping few bits first, and more bits later; for example, flipping one bit for each retry first, then two bits, and so on.

Figure 12:
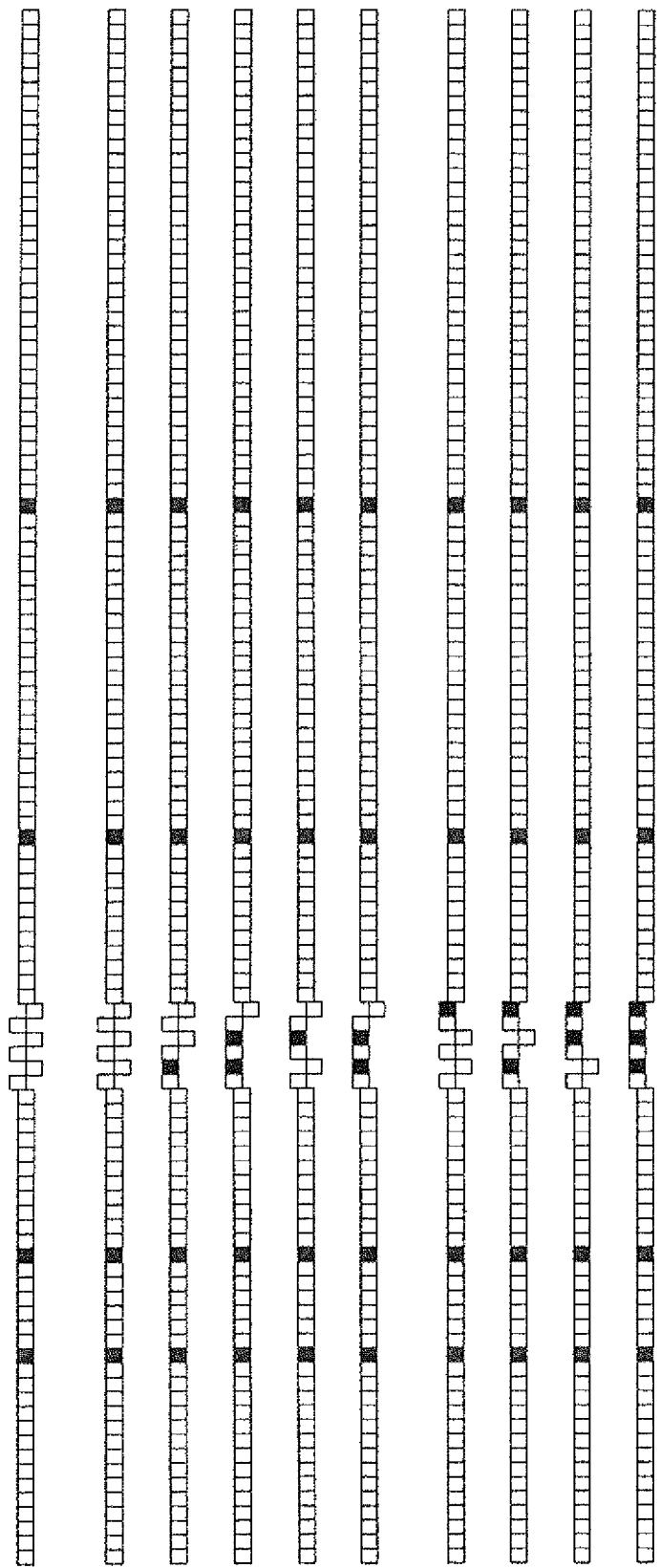
FIGS. 12 and 13 are two sequences illustrating flipping bits of a cluster.

Starting from the ECC code word of FIG. 11A, FIG. 12 illustrates an example of applying a cluster failure model. For the cluster fail bits 601, a box above the center line represents a 1 and a box below the line a bit with a value of 0. In this example, it is knows that the cluster has a stuck to 0 issue. From top to bottom, FIG. 12 is a sequence of flipping different combination of the 0 bits in 601 to read as 1 is until the content of the code word can be extracted. In this way, this sequence would be the different iterations of the loop from 409 back to 405 in FIG. 9A.

Figure 13:
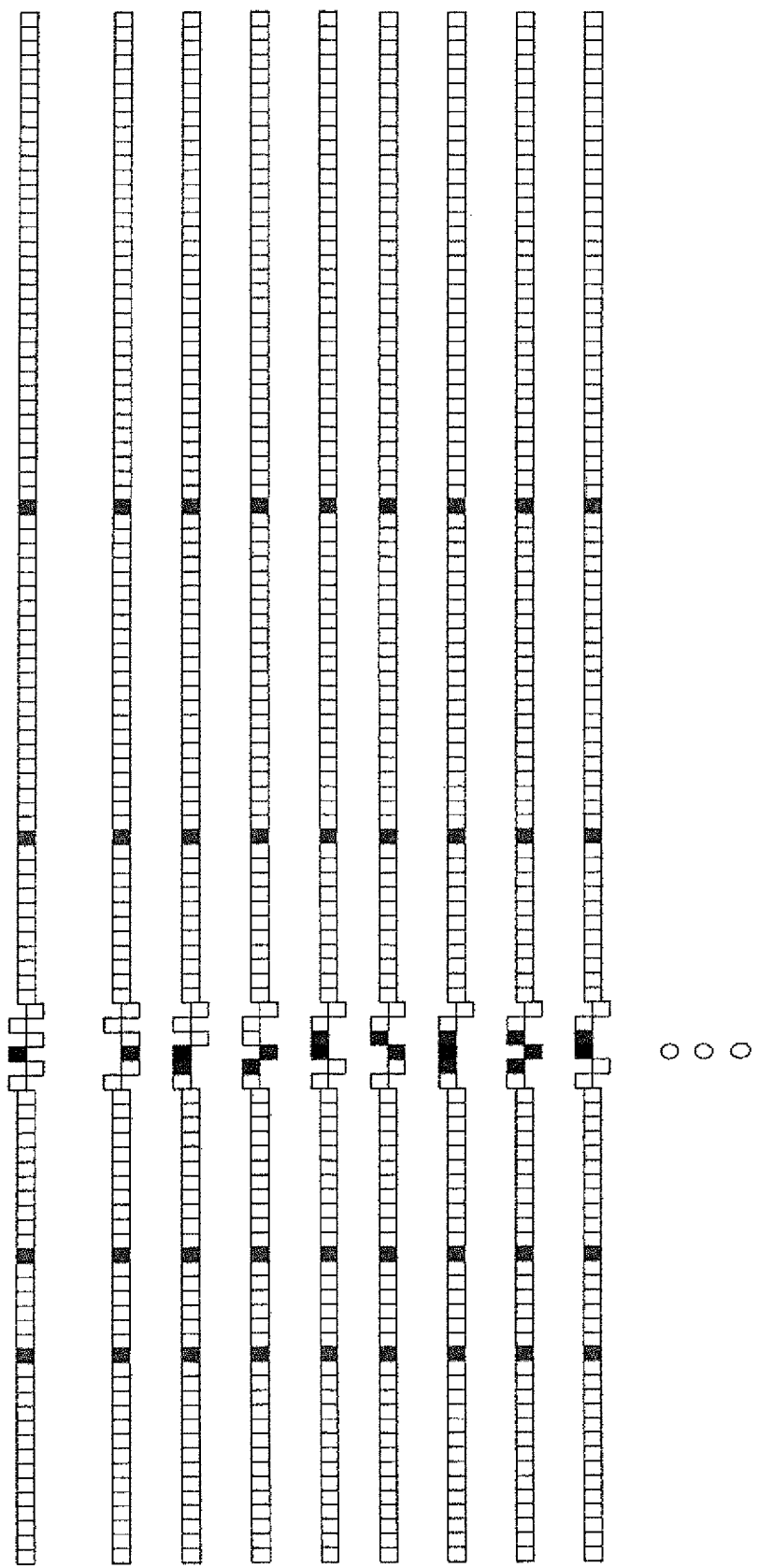

FIG. 13 illustrates a similar sequence for the case where there is not any knowledge of the particular error bias. In this case, the system can start flipping bits from the source (the black square of the cluster 601) expand outward from the hard fail bit.

There are several different ways to identify cluster bit locations. One way is through testing for failure or failure screen, such as is done as part of the test processes done on a device before it is shipped out from the factory. One example is that failure in one sense-amp might cause adjacent bits to fail. The manufacturer can run tests to identify sense-amp failure. Another example is column to column shorts. Global column tests can be used to identify columns that fail. Cluster locations can also be determined through recovered error bits with sub-code word ECC correction. Another way to identify cluster locations is to use multiple reading with varied read criteria, such as used in "margining", where the system can look at the variations between a read done with normal sensing parameters and one or more sensing with shifted sensing parameters. Flipping bit method does not to be confined to physical cluster location, but can be applied to locations where bit error rates are notably higher, where one way to identify such locations is to used multiple reading with varied read criteria. (More information on using shifted read parameters to extra data can be found in U.S. Pat. No. 7,886,204 and references cited therein.)

ECC Enhancements with Code Word Interleaving

This section looks at techniques for helping to reduce the effects of bit clusters. One way to reduce the effect of bit clusters is to interleave bits or group of bits (e.g. Byte) of code words along a word line. Referring to FIGS. 7 and 8, rather than each of the code words being stored contiguously as shown, one or more of the code words are interleaved. If bits from one code word can be corrected, the error bit locations in this code word can serve to predict possible bit failure locations of other code word. This knowledge can then be used in the bit flipping algorithm to correct more bit errors in other interleaving code words.

The interleaved code words can also be given different levels of different ECC capability, spreading the ECC budget is distributed non-uniformly across the code words of a page. For example, going back to FIG. 7, code words 0-2 could each be given 1 or 2 bits less for ECC, with the these extra ECC bits going to code word. The codes are then interleaved and, when reading, the code word with the higher ECC capability is corrected first. The error bit locations obtained from this ECC enhanced code word are the used to predict error bit location of the other code words. This scheme also help to reduce number parity bits required for the other code words, and thus reduced the overall parity bit count requirement (in other words, amount of memory needed to store parity in the NAND memory). Also, if a particular location, such a word line end, is more prone to suffer error clusters, the code word can be interleaved so that the code word with more parity bits is more heavily loaded into the defective location.

As an example, physically adjacent bit lines can be divided into two groups, of even and odd bit lines. If the probability of an error bit in a bit cluster is $p\_c$, then the random error bit is $1-p\_c$. Arbitrarily choosing the even bit line group as the high ECC group, the system can code the odd bits with ECC capability of only $(1-p\_c)$ amount of the even bit ECC capability. The ECC circuitry can correct the even bit group first and use the error bits location to predict the possible error location in odd bit lines as those adjacent to the error bits in even bit group.

A number of variations of these schemes are possible. For example, the bit lines can be divided into 3 or more groups, such as the same of groups as there are code words per page. Also, each group can be more than one bit lines, such alternating bytes onto ever set of eight bit lines. Since the parity bit counts are different for the code words depending on their respective ECC capability, parity bits can use other group's memory location. In addition, the ECC capability does not need to be set to the optimal value.

Conclusion

Although the various aspects of the present invention have been described with respect to certain embodiments, it is understood that the invention is entitled to protection within the full scope of the appended claims.

It is claimed:

1. A method of operating a non-volatile memory system, the memory system including a memory circuit, the memory circuit having an array of memory cells formed along bit lines and word lines and a controller circuit connected to the memory circuit and having ECC (error correction code) circuitry, the method comprising:
   receiving a page of data from a host by the controller circuit;
   fanning the page of data into a plurality of ECC code words by the controller circuit, including:
      separating the page of data into a corresponding plurality of sets of user data;
      for each of the sets of user data, generating by the EEC circuit of a corresponding set of FCC bits; and
      forming the plurality of code words each of one of the corresponding plurality of sets of user data and the corresponding set of ECC bits;
   arranging by the controller circuit of the plurality of ECC code words into an ECC protected page of data, wherein when programmed on to a word line of the array the ECC protected page of data is written such that the FCC code words thereof are written in an interleaved manner in which memory cells storing a first of the ECC codes words are along a first set of bit lines and memory cells storing a second of the ECC cord words are alone a second set of bit lines, one or more of first set of bit lines being between bit lines of the second set of bit lines;
   transferring the FCC protected page of data from the controller circuit to the memory circuit: and
   writing the FCC protected page of data on to a first word line of the memory array, wherein the FCC protected page of data is written and read by the memory circuit as a single page.

2. The method of claim 1, wherein one or more of the plurality of ECC code words is formed to have a higher degree of ECC capability than other ones of the plurality of the ECC code words.

3. The method of claim 2, wherein the ECC code words formed to have higher degree of ECC capability have a larger number of parity bits than the other ones of the plurality of the ECC code words.

4. The method of claim 1, wherein the bit lines of the array are formed into a plurality of columns and the plurality of ECC code words are interleaved in memory cells corresponding to pairs of odd and even columns of the array.

5. The method of claim 1, wherein the bit lines of the array are formed into a plurality of columns and the number of ECC code words of which the page of data is formed is N, where N is an integer three or greater, and the N ECC code words of the ECC protected page of data are written into every N-th column of the array 6. The method of claim 1, wherein the sets of ECC bits generated by the ECC circuit are of a low-density parity-check (LDPC) type of code.

7. The method of claim 1, wherein the array of memory cells is formed according to a NAND type of architecture.

8. The method of claim 1, wherein the memory circuit stores data in a multi-state format storing more than one page on a word line.

* * * * *

UNITED STATES PATENT AND TRADEMARK OFFICE
CERTIFICATE OF CORRECTION

| | |
|---|---|
| PATENT NO. | : 9,104,591 B2 |
| APPLICATION NO. | : 13/754644 |
| DATED | : August 11, 2015 |
| INVENTOR(S) | : Tam |

Page 1 of 1

It is certified that error appears in the above-identified patent and that said Letters Patent is hereby corrected as shown below:

In the Claims

Column 12, line 39, delete "fanning" and insert --forming--.

Column 12, line 43, delete "EEC" and insert --ECC--.

Column 12, line 44, delete "FCC" and insert --ECC--.

Column 12, line 44, delete "FCC" and insert --ECC--.

Column 12, line 51, delete "FCC" and insert --ECC--.

Column 12, line 58, delete "FCC" and insert --ECC--.

Column 12, line 60, delete "FCC" and insert --ECC--.

Column 12, line 61, delete "FCC" and insert --ECC--.

Signed and Sealed this
Twelfth Day of April, 2016

Michelle K. Lee
*Director of the United States Patent and Trademark Office*